United States Patent
Rupavatharam et al.

(10) Patent No.: US 11,388,141 B1
(45) Date of Patent: Jul. 12, 2022

(54) APPARATUS, SYSTEM, AND METHOD FOR EFFICIENTLY FILTERING PACKETS AT NETWORK DEVICES

(71) Applicant: Juniper Networks, Inc., Sunnyvale, CA (US)

(72) Inventors: Sreekanth Rupavatharam, Campbell, CA (US); Karen Zhang, San Jose, CA (US); Prashant Singh, Santa Clara, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 691 days.

(21) Appl. No.: 15/938,857

(22) Filed: Mar. 28, 2018

(51) Int. Cl.
*H04L 9/40* (2022.01)
(52) U.S. Cl.
CPC ...... *H04L 63/0263* (2013.01); *H04L 63/0236* (2013.01); *H04L 63/0245* (2013.01); *H04L 63/1425* (2013.01); *H04L 63/1441* (2013.01)
(58) Field of Classification Search
CPC ............ H04L 63/0263; H04L 63/0236; H04L 63/0245; H04L 63/1425; H04L 63/1441
See application file for complete search history.

(56) References Cited

U.S. PATENT DOCUMENTS

| | | | | |
|---|---|---|---|---|
| 6,370,583 B1* | 4/2002 | Fishler | ............... | H04L 69/16 709/245 |
| 6,496,935 B1* | 12/2002 | Fink | ............... | H04L 63/0254 726/13 |
| 2003/0126272 A1* | 7/2003 | Corl, Jr. | ............... | H04L 69/166 709/230 |
| 2005/0055399 A1* | 3/2005 | Savchuk | ............... | H04L 63/1416 709/203 |
| 2009/0316698 A1* | 12/2009 | Menten | ............... | H04L 47/36 370/392 |
| 2011/0179479 A1* | 7/2011 | Tsai | ............... | H04L 63/0227 726/13 |
| 2012/0210416 A1* | 8/2012 | Mihelich | ............... | H04L 67/1004 726/11 |
| 2016/0323302 A1* | 11/2016 | Teixeira | ............... | H04L 63/0227 |

OTHER PUBLICATIONS

Broken Packets; https://blog.cloudflare.com/ip-fragmentation-is-broken/.
What are Ethernet, IP, and TCP Headers in Wireshark Captures; http://networkstatic.net/what-are-ethernet-ip-and-tcp-headers-in-wireshark-captures/.

* cited by examiner

*Primary Examiner* — Alexander Lagor
*Assistant Examiner* — Forrest L Carey
(74) *Attorney, Agent, or Firm* — FisherBroyles, LLP

(57) ABSTRACT

The disclosed apparatus may include (1) flagging, at a packet filter within a network device, a packet to be discarded instead of passed to a processing unit within the network device, (2) determining that the packet is part of a set of related packets that includes at least one additional packet destined at least intermediately for the network device, (3) identifying, by monitoring incoming packets received at the packet filter, the additional packet within the set of related packets, and then (4) discarding, due to the additional packet being included within the set of related packets, the additional packet instead of passing the additional packet to the processing unit. Various other apparatuses, systems, and methods are also disclosed.

15 Claims, 7 Drawing Sheets

APPARATUS, SYSTEM, AND METHOD FOR EFFICIENTLY FILTERING PACKETS AT NETWORK DEVICES

BACKGROUND

To combat the growing threat of network-based attacks, many of today's network devices implement packet filters that detect and then discard malicious packets. For example, a firewall filter may identify packets with suspicious attributes (such as packets originating from particular network devices or ports). The firewall filter may then discard or drop these packets instead of passing them to a routing engine or a forwarding engine of a network device. Such filters within network devices may improve the security of both the network devices themselves and the networks they provide.

In some situations, a packet filter may receive a packet that is part of a set of related and/or associated packets. For example, a network device may divide a large packet into several smaller packet fragments to facilitate forwarding the packet along a network path. A network device that receives these packet fragments may combine and/or reassemble the fragments in order to generate the original version of the packet.

Unfortunately, traditional packet-filtering systems may be unable to appropriately flag or detect some packet fragments. For example, one or more fragmented portions of a packet may contain a characteristic used by a conventional packet filter to identify malicious packets. However, not all of the fragments may contain this characteristic. As such, the conventional packet filter may forward the fragments without the characteristic to a processing unit within a network device instead of dropping the fragments. The processing unit may attempt to process and/or handle the fragments, but may ultimately be unable to do so because the fragments are not complete packets. Thus, a traditional packet filter that forwards these packet fragments may unnecessarily increase the workload of a network device. Moreover, forwarding fragments of malicious packets may expose network devices to potentially harmful security threats.

The present disclosure, therefore, identifies and addresses a need for improved apparatuses, systems, and methods for efficiently filtering packets at network devices.

SUMMARY

As will be described in greater detail below, the instant disclosure generally relates to apparatuses, systems, and methods for efficiently filtering packets at network devices. In one example, a computer-implemented method for performing this task may include (1) flagging, at a packet filter within a network device, a packet to be discarded instead of passed to a processing unit within the network device, (2) determining that the packet is part of a set of related packets that includes at least one additional packet destined at least intermediately for the network device, (3) identifying, by monitoring incoming packets received at the packet filter, the additional packet within the set of related packets, and then (4) discarding, due to the additional packet being included within the set of related packets, the additional packet instead of passing the additional packet to the processing unit.

As another example, a system for implementing the above-described method may include various modules stored in memory. The system may also include at least one hardware processor that executes these modules. For example, the system may include (1) a flagging module that flags, at a packet filter within a network device, a packet to be discarded instead of passed to a processing unit within the network device, (2) a determination module that determines that the packet is part of a set of related packets that includes at least one additional packet destined at least intermediately for the network device, (3) an identification module that identifies, by monitoring incoming packets received at the packet filter, the additional packet within the set of related packets, and (4) a discard module that discards, due to the additional packet being included within the set of related packets, the additional packet instead of passing the additional packet to the processing unit.

As a further example, an apparatus for implementing the above-described method may include at least one storage device that stores rules used by a packet filter within a network device to discard certain packets received at the network device. In this example, the apparatus may also include at least one physical processing device communicatively coupled to the storage device. This physical processing device may (1) flag, based on at least one rule within the storage device, a packet to be discarded at the packet filter instead of passed to a processing unit within the network device, (2) determine that the packet is part of a set of related packets that includes at least one additional packet destined at least intermediately for the network device, (3) identify, by monitoring incoming packets received at the packet filter, the additional packet within the set of related packets, and then (4) discard, due to the additional packet being included within the set of related packets, the additional packet instead of passing the additional packet to the processing unit.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
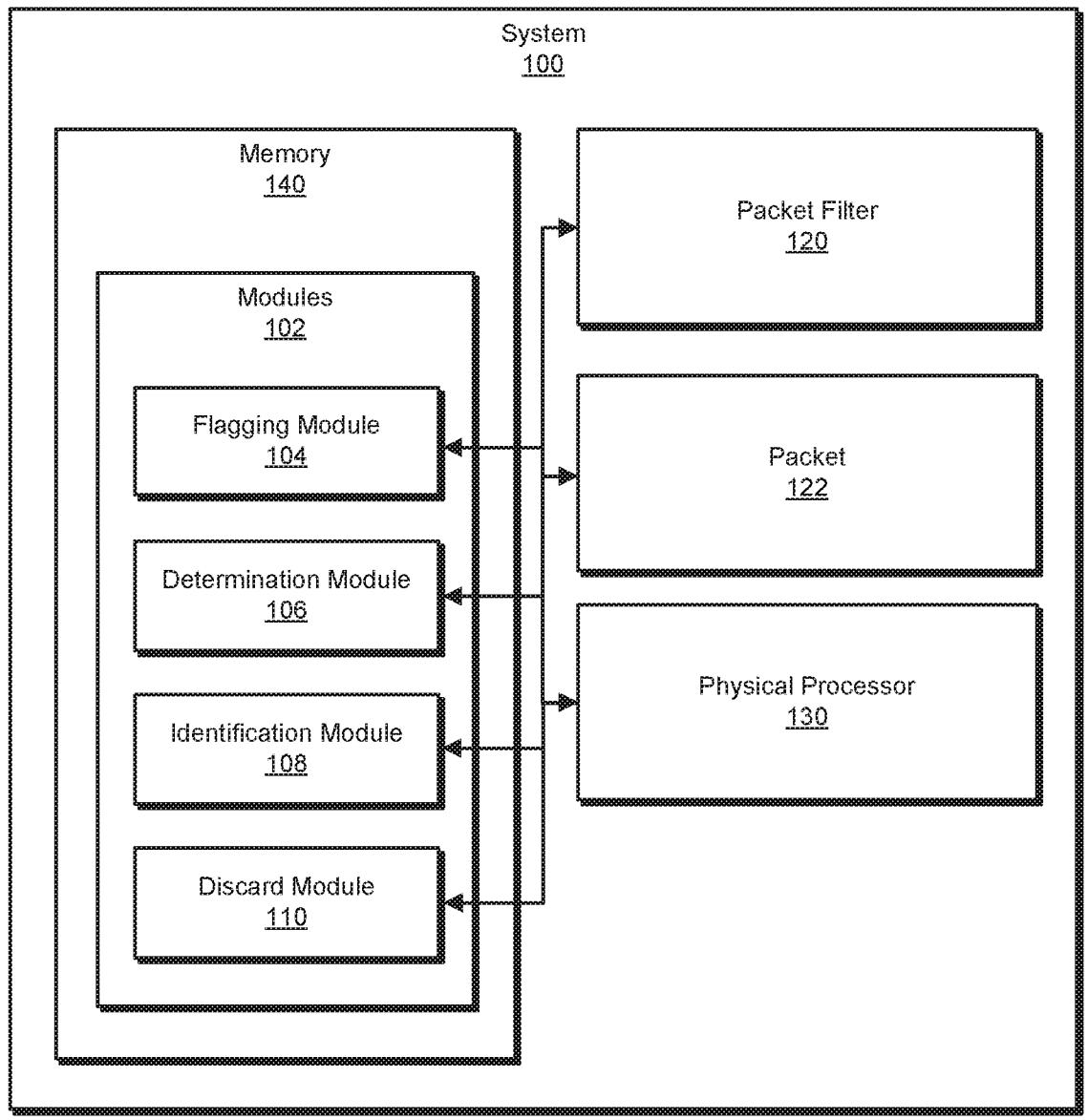
FIG. 1 is a block diagram of an exemplary system for efficiently filtering packets at network devices.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for efficiently filtering packets at network devices. As will be explained in greater detail below, embodiments of the instant disclosure may detect related and/or associated packets at a packet filter of a network device. For example, after determining that a packet fragment that is part of an original, larger packet is to be discarded at a packet filter instead of forwarded, the disclosed packet-filtering systems may dynamically generate and implement a packet filter rule that detects each remaining fragment of the original packet. Specifically, this rule may detect (and then discard) the remaining fragments before they are passed to a routing engine and/or forwarding engine of a network device. In this way, the disclosed systems and methods may prevent network devices from unnecessarily consuming power and/or network bandwidth while attempting to process packet fragments.

Figure 2:
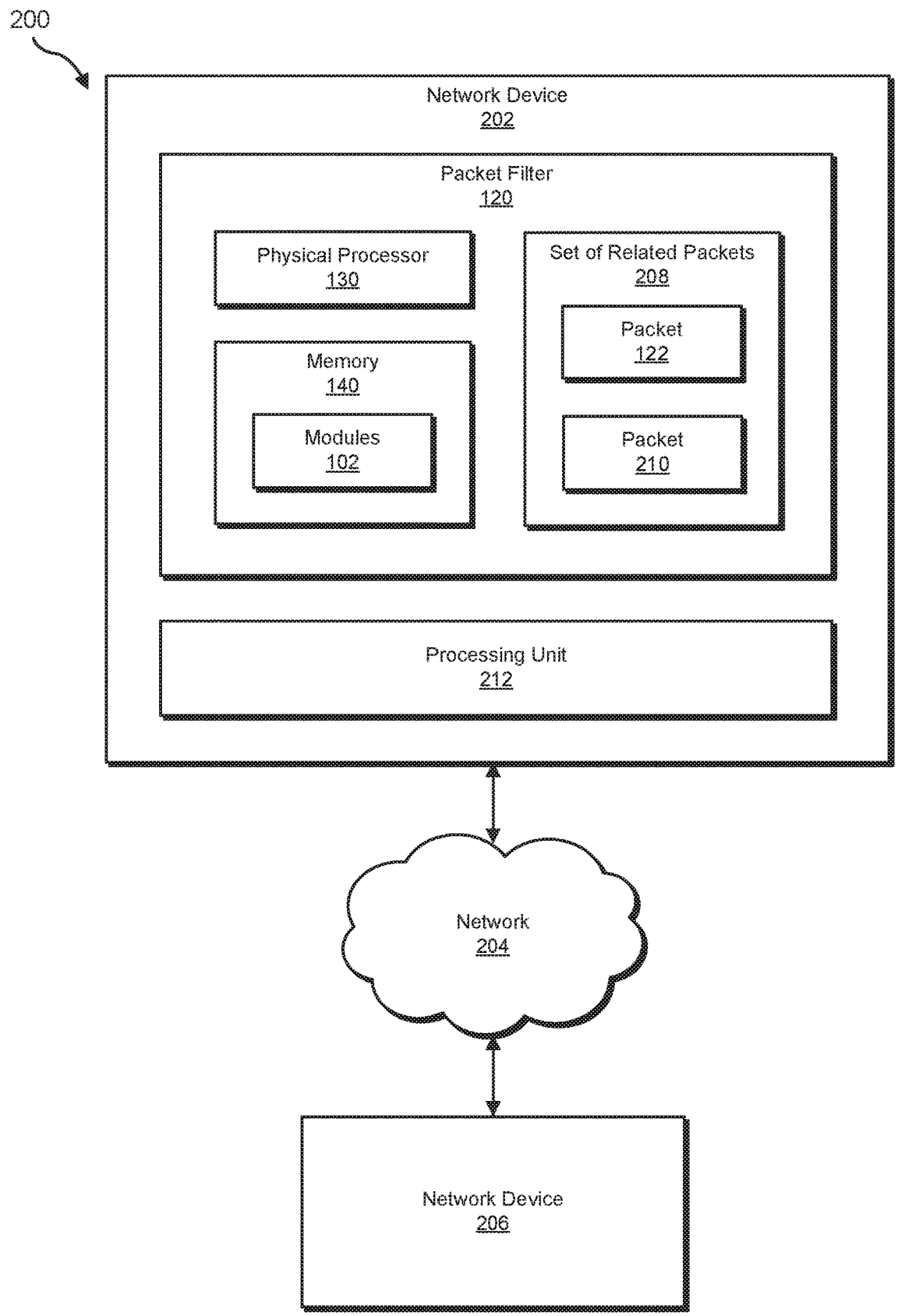
FIG. 2 is a block diagram of an additional exemplary system for efficiently filtering packets at network devices.

The following will provide, with reference to FIGS. 1 and 2, detailed descriptions of exemplary systems for efficiently filtering packets at network devices. Detailed descriptions of corresponding computer-implemented methods will be provided in connection with FIGS. 3 and 6. In addition, detailed descriptions of packets received at network devices will be provided in connection with FIGS. 4 and 5. Finally, detailed descriptions of an exemplary computing system for carrying out these methods will be provided in connection with FIG. 7.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network device 202 and/or network device 206). In addition, one or more of modules 102 may perform any of the functionality described herein in connection with any of the devices illustrated in FIG. 2. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate filtering packets at network device 202. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more packet filters, such as a packet filter 120. Packet filter 120 generally represents any type or form of software- and/or hardware-based program or module that detects suspicious and/or malicious packets received at a network device. For example, packet filter 120 may represent a firewall or similar type of filter that identifies potential security threats by comparing characteristics of incoming packets with a set of rules and/or criteria corresponding to malicious packets. In the event that packet filter 120 determines that an incoming packet represents a potential security threat, packet filter 120 may perform one or more actions to ensure that the packet does not harm the network device that implements packet filter 120 and/or an additional network device. For example, packet filter 120 may drop, delete, or otherwise discard the packet. Additionally or alternatively, packet filter 120 may perform a more in-depth security analysis of packet and/or alert an administrator or user about the packet.

In addition, packet filter 120 may determine that some packets received at a network device are legitimate or benign. For example, packet filter 120 may determine that a packet received at a network device is not a security threat by determining that the packet does not match criteria within any of the packet-filtering rules implemented by packet filter 120. In this example, packet filter 120 may forward the packet to a routing engine, forwarding engine, and/or other type of processing unit within the network device. In this way, the network device may route, forward, and/or otherwise handle the packet in accordance with an intended route and/or destination of the packet.

Packet filter 120 may be implemented within a network device in a variety of ways. For example, packet filter 120 may be implemented within a routing engine and/or forwarding engine of a network device. Additionally or alternatively, packet filter 120 may be implemented directly within the hardware infrastructure of a network device. Moreover, in some embodiments, all or a portion of modules 102 may be implemented within and/or as part of packet filter 120.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 202 and a network device 206. In one example, all or a portion of the functionality of modules 102 may be performed by network device 202 and/or network device 206. As will be described in greater detail below, one or more of modules 102 from FIG. 1 may, when executed by at least one processor of network device 202, enable packet filter 120 to detect sets of related packets received by network device 202.

Network device 202 and network device 206 generally represent any type or form of physical computing devices capable of reading computer-executable instructions and/or handling network traffic. In one example, network devices 202 and 206 may include and/or represent network devices that operate packet filter 120 in order to protect the security of one or more client devices that access a network (e.g., network 204) via network devices 202 and/or 206. In other examples, network devices 202 and 206 may include and/or represent client devices that receive, route, forward, and/or otherwise handle network traffic. Additional examples of network devices 202 and 206 include, without limitation, routers (such as provider edge routers, hub routers, spoke routers, autonomous system boundary routers, and/or area border routers), switches, hubs, modems, bridges, repeaters, gateways, multiplexers, network adapters, network interfaces, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing devices.

Network 204 generally represents any medium or architecture capable of facilitating communication or data transfer. In one example, network 204 may facilitate communication between network devices 202 and 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, network devices 202 and 206 may each represent a portion of network 204 and/or be included in network 204.

As shown in FIG. 2, network device 202 may include a set of related packets 208. Set of related packets 208 generally represents any group or cluster of packets that are affiliated with and/or connected to each other. In one example, set of related packets 208 may represent a group of packet fragments. Each of these packet fragments may represent a portion of an original packet that was divided into multiple fragments by a network device. For example, network device 206 may generate set of related packets 208 by dividing a packet into multiple fragments such that each fragment complies with a maximum transmission unit (MTU) value of a network path between network device 206 and network device 202.

As shown in FIG. 2, set of related packets 208 may include packet 122 and a packet 210. Set of related packets 208 may include any additional or alternative packet not shown in FIG. 2. Moreover, set of related packets 208 may contain and/or represent packets with any additional or alternative type of affiliation or connection, such as packets distributed by the same entity and/or packets that contain similar content.

In some examples, network device 202 may include a processing unit 212. Processing unit 212 generally represents any type or form of software- and/or hardware-based unit, component, module, and/or device that analyzes and/or handles network traffic. For example, processing unit 212 may receive and then handle packets that packet filter 120 forwards to processing unit 212 (e.g., packets that packet filter 120 determines are legitimate or benign). Examples of processing unit 212 include, without limitation, a routing engine, a forwarding engine, a data plane, a control plane, a physical processor, combinations of one or more of the same, variations of one or more of the same, and/or any additional type of processing unit. Although illustrated as separate components within FIG. 2, processing unit 212 may include and/or implement all or a portion of packet filter 120. For example, packet filter 120 may represent a module or program contained within processing unit 212.

Figure 3:
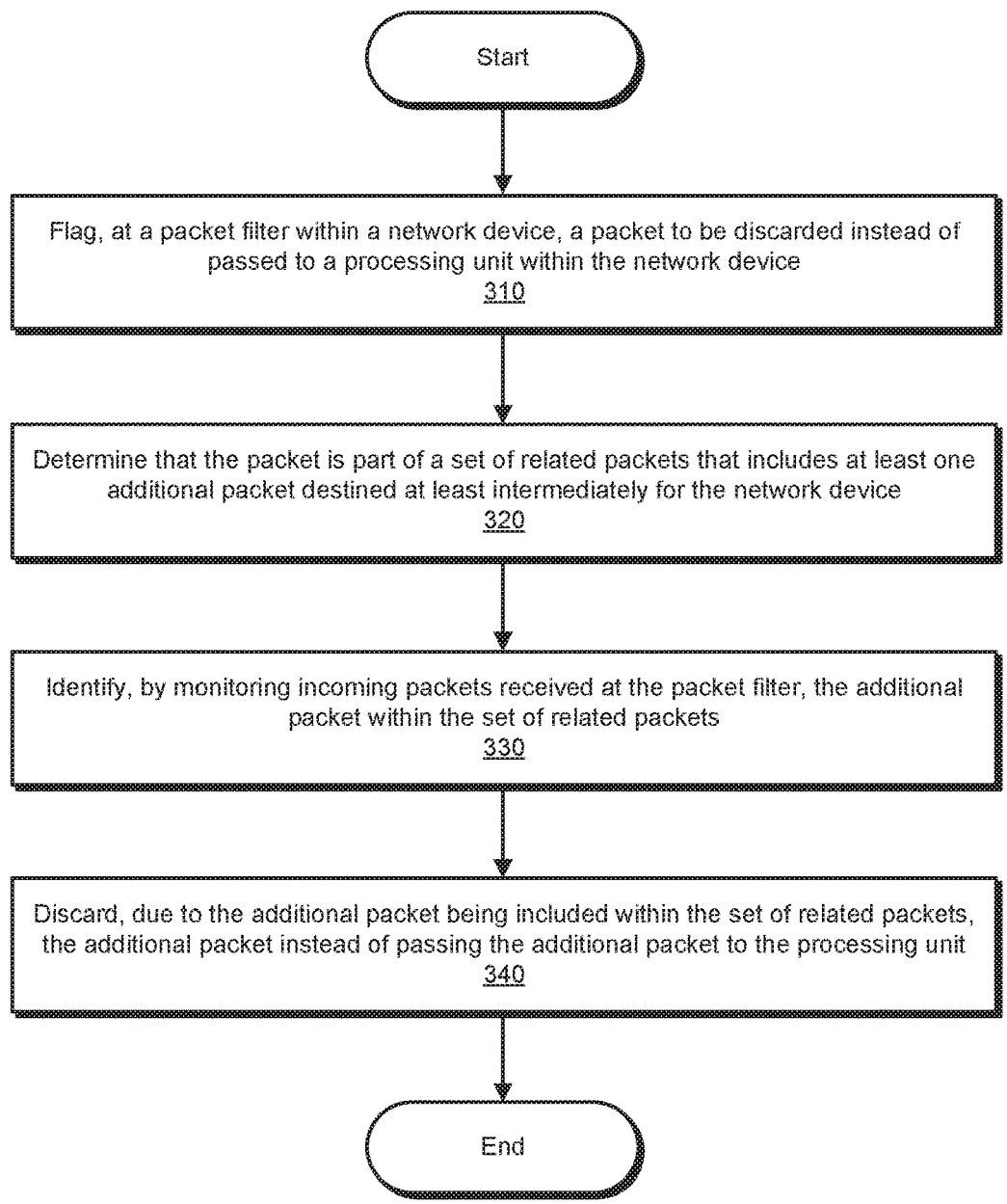
FIG. 3 is a flow diagram of an exemplary method for efficiently filtering packets at network devices.

FIG. 3 is a flow diagram of an example computer-implemented method 300 for efficiently filtering packets at network devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may flag, at a packet filter within a network device, a packet to be discarded instead of passed to a processing unit within the network device. For example, flagging module 104 may, as part of network device 202 in FIG. 2, flag packet 122 to be discarded instead of passed to processing unit 212 within network device 202. In one example, flagging module 104 may operate as part of packet filter 120 within network device 202.

The systems described herein may perform step 310 in a variety of ways and/or contexts. In some examples, flagging module 104 may receive packet 122 at packet filter 120. For example, flagging module 104 may receive packet 122 as packet 122 arrives at network device 202 (e.g., before packet 122 is processed and/or handled by processing unit 212). Flagging module 104 may then compare characteristics of packet 122 with a set of packet-filtering rules stored within and/or in connection with packet filter 120. These rules may contain criteria that identify characteristics of packets known to be suspicious and/or malicious. For example, these rules may identify source ports, destination ports, source internet protocol (IP) addresses, destination IP addresses, header flags, and/or types of payload content associated with and/or previously identified within malicious packets.

In one embodiment, flagging module 104 may determine that packet 122 contains one or more suspicious or malicious characteristics based on this set of packet-filtering rules. Accordingly, flagging module 104 may ensure that packet 122 does not compromise the security and/or performance of network device 202 (or another device connected to network device 202) by indicating that packet 122 is to be deleted, dropped, or otherwise discarded. For example, flagging module 104 may remove packet 122 from a cache or portion of memory within packet filter 120 rather than passing packet 122 to processing unit 212.

Figure 4:
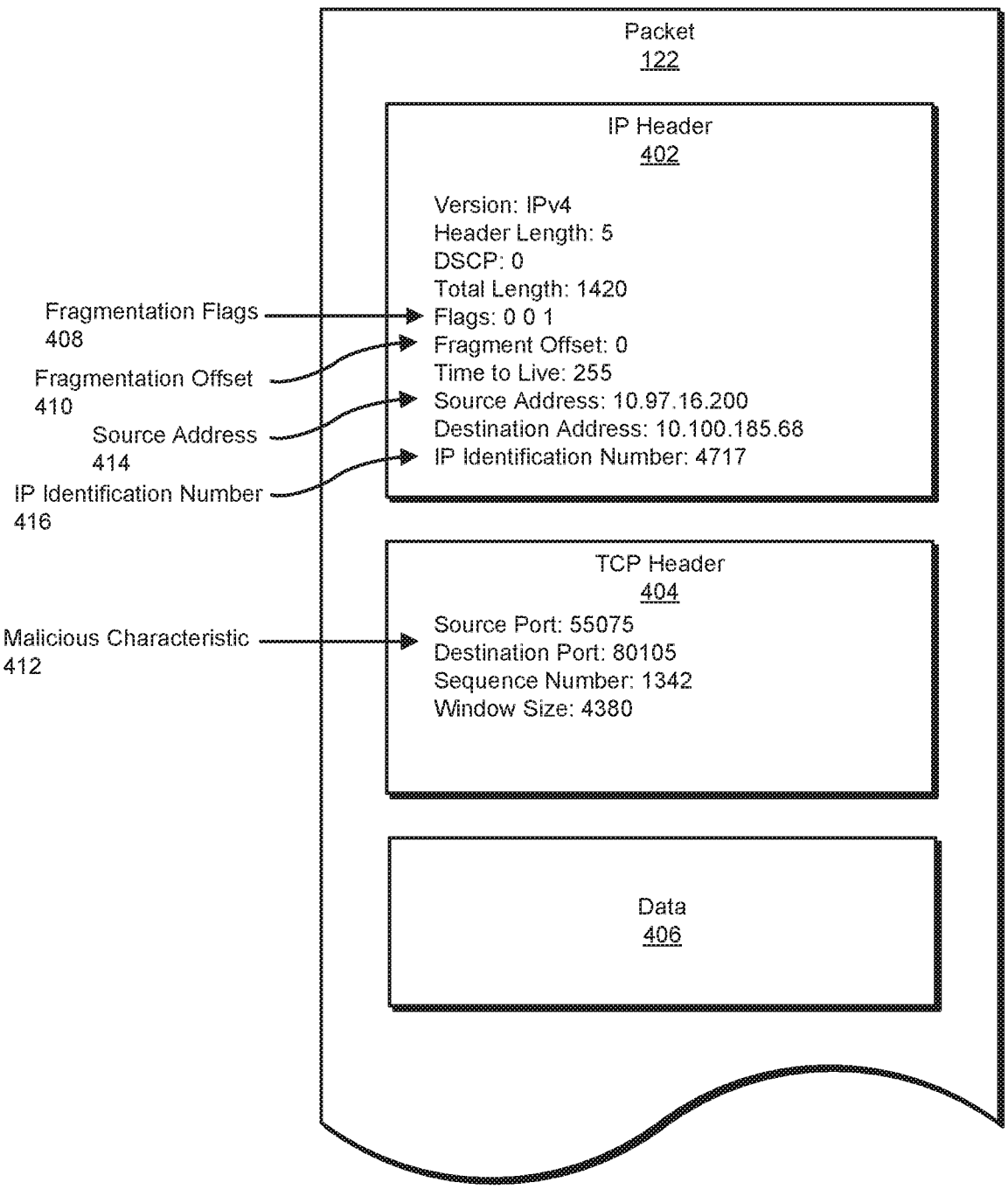
FIG. 4 is an illustration of an exemplary packet received at a network device.

FIG. 4 illustrates an exemplary embodiment of packet 122. In this example, packet 122 may contain one or more headers, such as an IP header 402 and a Transmission Control Protocol (TCP) header 404. These headers may correspond to Layer 3 and Layer 4 headers, respectively. As shown in FIG. 4, packet 122 may also contain data 406.

In one embodiment, flagging module 104 may flag packet 122 to be discarded based on an analysis of the information contained within TCP header 404. For example, flagging module 104 may determine that packet 122 is likely malicious based at least in part on determining that the source port of packet 122 is port "55075." As shown in FIG. 4, this source port may represent a malicious characteristic 412. Flagging module 104 may determine that packet 122 should be discarded based on any additional or alternative information within TCP header 404, IP header 402, and/or data 406.

Returning to FIG. 3, at step 320 one or more of the systems described herein may determine that the packet is part of a set of related packets that includes at least one additional packet destined at least intermediately for the network device. For example, determination module 106 may, as part of network device 202 in FIG. 2, determine that packet 122 is part of set of related packets 208. In one example, determination module 106 may operate as part of packet filter 120 within network device 202. In addition, determination module 106 may perform step 320 in response to determining that flagging module 104 has flagged packet 122 to be discarded. In other words, determination module 106 may not perform step 320 on packets that flagging module 104 passes to processing unit 212.

The systems described herein may perform step 320 in a variety of ways and/or contexts. In some examples, determination module 106 may determine that packet 122 is part of set of related packets 208 based on determining that packet 122 is a packet fragment. The term "packet fragment," as used herein, generally refers to any packet that represents a portion and/or segment of another packet. As mentioned above, a packet fragment may be generated by a network device in response to the network device determining that the size of a packet does not comply with the MTU value of an intended network path of the packet. For example, network device 206 may divide a large packet into set of related packets 208 such that the size of each packet within set of related packets 208 complies with the MTU value of a network path between network device 206 and network device 202. Each packet within set of related packets 208 may contain a portion of the payload and/or data within the original packet. In addition, the headers of each packet within set of related packets 208 may contain at least a portion of the information within the headers of the original packet.

In one embodiment, determination module 106 may determine that packet 122 is a packet fragment based on information within a header of packet 122. In the example of FIG. 4, determination module 106 may determine that packet 122 is a packet fragment based on one or more of fragmentation flags 408 within IP header 402 of packet 122. Specifically, determination module 106 may determine that the third fragmentation bit of fragmentation flags 408 has been set, indicating that additional packet fragments (i.e., packet fragments in addition to packet 122) of an original packet have been generated and directed to network device 202. In one embodiment, determination module 106 may determine that these additional packet fragments have not yet arrived at network device 202 and/or packet filter 120. Determination module 106 may therefore determine that the disclosed systems should monitor incoming packets to detect each of these additional packets as the additional packets arrive at packet filter 120.

In one example, determination module 106 may determine that packet 122 represents the first or initial packet fragment within set of related packets 208. For example, determination module 106 may determine that packet 122 is the first packet fragment based on a fragmentation offset 410 within IP header 402 being "0". In general, determination module 106 may determine that packet 122 is a packet fragment (e.g., an initial packet fragment) based on any additional or alternative information within IP header 402, TCP header 404, and/or another header of packet 122.

Returning to FIG. 3, at step 330 one or more of the systems described herein may identify, by monitoring incoming packets received at the packet filter, the additional packet within the set of related packets. For example, identification module 108 may, as part of network device 202 in FIG. 2, identify packet 210 within set of packets 208 by monitoring incoming packets received at packet filter 120. In one example, identification module 108 may operate as part of packet filter 120 within network device 202.

The systems described herein may perform step 330 in a variety of ways and/or contexts. In some examples, identification module 108 may dynamically generate and implement a packet-filtering rule that contains criteria capable of and/or designed to identify packet 210. For example, identification module 108 may determine that packet 210 will share and/or is expected to share certain characteristics with packet 122. Identification module 108 may then create a rule that detects packets with these characteristics.

In one embodiment, identification module 108 may generate a packet-filtering rule that detects packet fragments that are related to and/or part of the same original (e.g., unfragmented) packet as packet 122. For example, identification module 108 may determine that each packet fragment related to packet 122 will originate from the same source IP address and/or be destined for the same destination IP address as packet 122. Additionally or alternatively, identification module 108 may determine that each packet fragment related to packet 122 will have the same IP identification field number as packet 122. Accordingly, identification module 108 may generate a packet-filtering rule that detects packets who share all or a portion of these characteristics with packet 122.

As an example, identification module 108 may determine that the source IP address and the IP identification number (in combination) of a packet fragment uniquely correspond to and/or may be used to identify related packet fragments. Accordingly, identification module 108 may generate a packet-filtering rule that detects packets with the same source IP address and IP identification number as packet 122. In addition, identification module 108 may generate this packet-filtering rule such that it also detects packets that are packet fragments (as opposed to original, unfragmented packets). Identification module 108 may then dynamically implement and/or activate this rule within packet filter 120.

Figure 5:
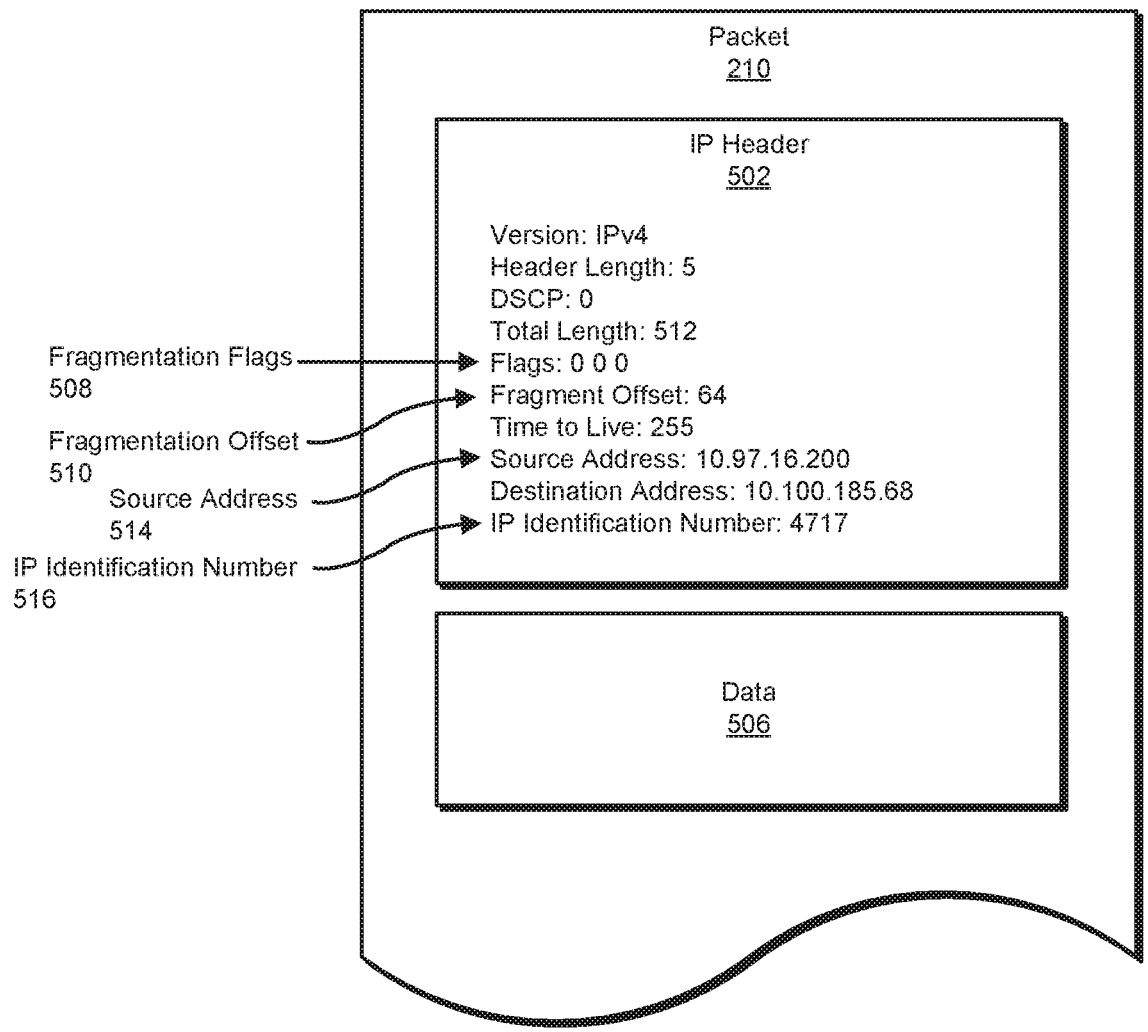
FIG. 5 is an illustration of an additional exemplary packet received at a network device.

FIG. 5 illustrates an exemplary embodiment of packet 210. As shown in FIG. 5, packet 210 may contain an IP header 502 and data 506. In this example, packet 210 may represent a packet fragment that is related to packet 122. For example, packet 122 and packet 210 may represent two fragments of an original packet that was fragmented by network device 206.

In one embodiment, identification module 108 may detect packet 210 at packet filter 120 based at least in part on a packet-filtering rule that identifies packet fragments that have the same source IP address and IP identification number as packet 122. For example, identification module 108 may determine that a source address 414 of packet 122 is "10.97.16.200" and an IP identification number 416 of packet 122 is "4717." Identification module 108 may then generate a rule that instructs packet filter 120 to compare the source address and IP identification number of incoming packets with source address 414 and IP identification number 416. When packet 210 arrives at packet filter 120, packet filter 120 may determine that a source address 514 of packet 210 matches source address 414. In addition, packet filter 120 may determine that an IP identification number 516 of packet 210 matches IP identification number 416.

In some examples, this packet-filtering rule may also instruct packet filter 120 to identify packet fragments based on fragmentation offsets within headers of incoming packets. For example, when packet 210 arrives at packet filter 120, packet filter 120 may determine that packet 210 is a packet fragment based on a fragmentation offset 510 within IP header 502 being "64" (i.e., not "0"). Based on both packet 210 having the same source address and IP identification number as packet 122 and packet 210 being a packet fragment, identification module 108 may determine that packet 210 is part of set of related packets 208. Packet filter 120 may determine that packet 210 is related to packet 122 based on any one or combination of additional or alternative properties, characteristics, and/or data within packet 210.

Notably, packet 210 may not include a TCP header. For example, packet fragments (other than initial packet fragments, such as packet 122), may generally not include TCP headers. Because packet 210 does not include a TCP header, packet 210 may not include malicious characteristic 412. Thus, conventional packet filters that identify malicious packets based on information within TCP headers may be unable to determine that packet 210 is a malicious packet and/or related to a malicious packet. In contrast to the disclosed systems, a conventional packet filter may determine that packet 210 is a legitimate or benign packet. This conventional packet filter may then pass packet 210 to a processing unit within the network device that received packet 210, thereby wasting computing resources of the processing unit and/or potentially compromising the security of the network device.

In some embodiments, identification module 108 may continue to monitor incoming packets at packet filter 120 until determining that each packet within set of related packets 208 has been received. For example, identification module 108 may identify packet fragments that are related to packet 122 until determining that each packet fragment of the original packet has been received. In the example of FIGS. 4 and 5, identification module 108 may determine that packet 210 represents the second and final packet fragment related to packet 122. In one embodiment, identification module 108 may make this determination based on fragmentation flags 508 within IP header 502 of packet 210. As shown in FIG. 5, the last bit of fragmentation flags 508 may be 0, indicating that no additional related packet fragments have been generated and/or distributed to network device 202.

Identification module 108 may determine that each packet within set of related packets 208 has been received at packet filter 120 in any additional or alternative manner. For example, identification module 108 may determine that all packet fragments related to an initial packet fragment are expected to arrive at a network device within a certain amount of time (e.g., 2 seconds) following receipt of the initial packet fragment. Accordingly, identification module 108 may infer and/or conclude that each packet within set of packets 208 has been received after this amount of time has lapsed. Additionally or alternatively, identification module 108 may determine that a subsequent packet fragment is expected to arrive at packet filter 120 within a certain amount of time (e.g., 0.5 seconds) following receipt of an initial or previously-received packet fragment. Accordingly, identification module 108 may infer and/or conclude that each packet within set of packets 208 has been received in the event that no packets are received at packet filter 120 within this amount of time.

After determining that each packet within set of related packets 208 has been received, identification module 108 may stop attempting to identify related packets. For example, identification module 108 may deactivate the packet-filtering rule that was used to detect additional packets within set of related packets 208. In one embodiment, identification module 10 may remove the rule from a list of currently-active rules and/or delete the rule from a portion of memory within packet filter 120 that stores packet-filtering rules. In the example of FIGS. 4 and 5, identification module 108 may deactivate the rule that instructs packet filter 120 to compare the source IP address of incoming packets with source address 414 and analyze fragmentation flags within incoming packets. By dynamically activating and deactivating such rules, the disclosed systems may efficiently and accurately detect a set of related packets as the packets arrive at a packet filter of a network device.

Returning to FIG. 3, at step 340 one or more of the systems described herein may discard, due to the additional packet being included within the set of related packets, the additional packet instead of passing the additional packet to the processing unit. For example, discard module 110 may, as part of network device 202 in FIG. 2, discard packet 210 instead of passing packet 210 to processing unit 212 due to packet 210 being part of set of related packets 208. In one example, discard module 110 may operate as part of packet filter 120 within network device 202.

The systems described herein may perform step 340 in a variety of ways and/or contexts. In some examples, discard module 110 may delete, drop and/or otherwise discard packet 210 in response to identification module 108 determining that packet 210 is part of set of related packets 208. For example, discard module 110 may automatically discard each packet within set of packets 208 as the packets are identified at packet filter 120. In this way, discard module 110 may ensure that no packet within set of related packets 208 reaches processing unit 212.

Discarding packet 210 may improve the performance and/or security of network device 202. For example, discard module 110 may determine that packet 210 is likely malicious based on packet 210 being related to packet 122 (which may contain malicious characteristic 412). Accordingly, discard module 110 may discard packet 210 to prevent packet 210 from compromising the security of network device 202 and/or another network device that may potentially encounter packet 210.

Additionally or alternatively, discard module 110 may discard packet 210 to ensure that processing unit 212 does not waste computing resources attempting to process packet 210. For example, network devices may attempt to reassemble a set of related packet fragments in order to recreate and then process the original (e.g., unfragmented) version of a packet. In some embodiments, a network device may be unable to accurately reassemble an original version of a packet in the event that not all packet fragments of the packet are available. For example, processing unit 212 may be unable to reassemble the packet that network device 206 divided into packet 122 packet and packet 210 if one or both of these packet fragments have been discarded. In the event that a conventional packet filter discards packet 122 but passes packet 210 to processing unit 212, processing unit 212 may attempt to analyze packet 210. This analysis may be ultimately futile because packet 210 may not include sufficient information (such as a TCP header and/or complete payload) to facilitate forwarding packet 210 to its intended destination. While the outcome of this failed analysis may be desirable (e.g., the failed analysis may prevent any portion of a malicious packet from being forwarded), this analysis may divert and/or consume the processing power of processing unit 212.

Moreover, in some embodiments, conventional packet-filtering systems may unnecessarily consume network bandwidth. For example, a conventional packet filter that is implemented within the routing engine of network device 202 may forward packet 210 to the forwarding engine of network device 202 via a network link, thereby increasing the network bandwidth utilized by the packet filter. By determining that packet 210 is related to packet 122 at packet filter 120, embodiments of the instant disclosure may accurately filter undesirable network packets while reducing the time, power, and/or network bandwidth consumed by traditional packet filters.

Figure 6:
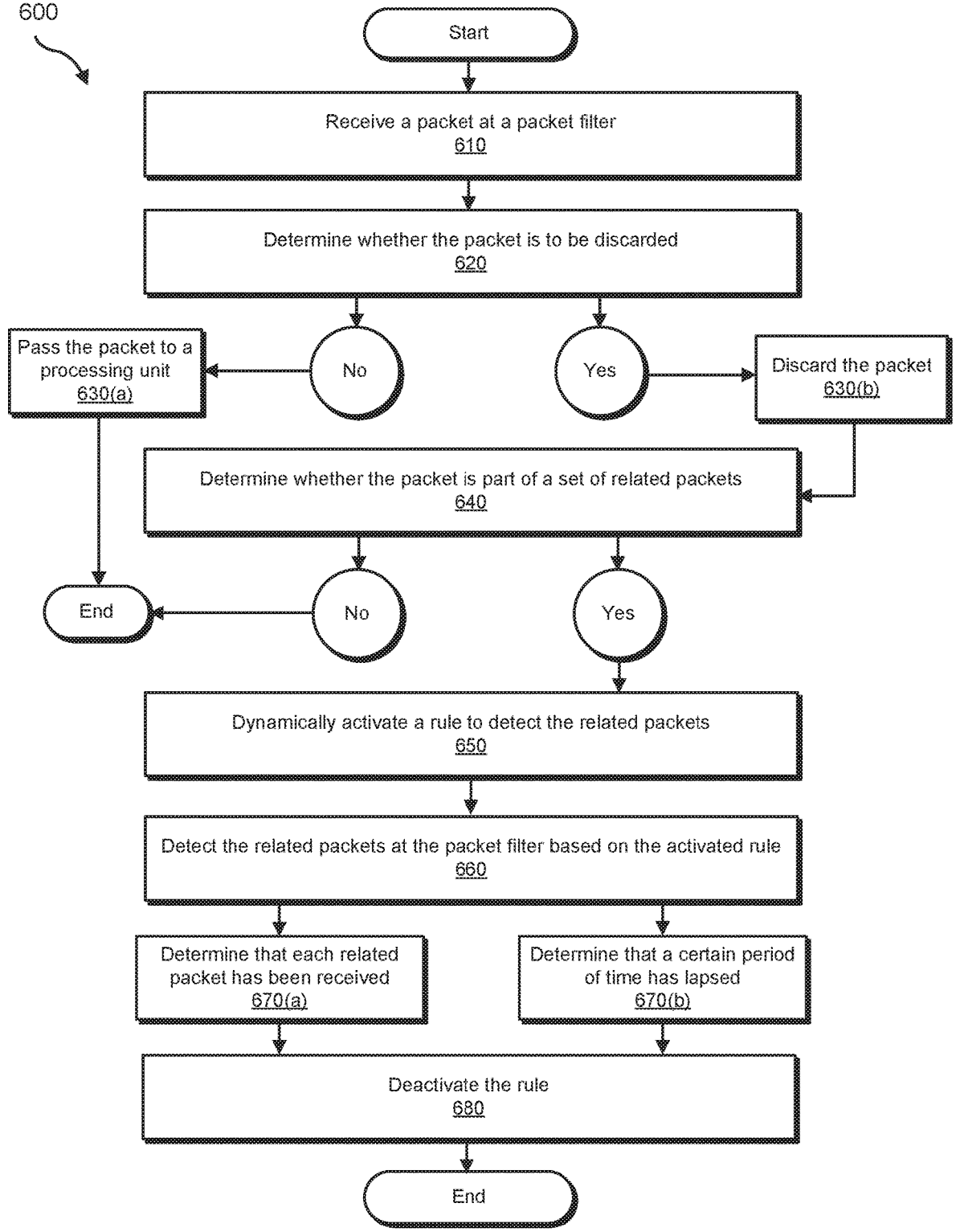
FIG. 6 is a flow diagram of an additional exemplary method for efficiently filtering packets at network devices.

FIG. 6 illustrates an exemplary method 600 for efficiently filtering packets at network devices. As shown in FIG. 6, at step 610 a packet may be received at a packet filter of a network device. At step 620, the packet filter may determine whether the packet is to be discarded. For example, the packet filter may determine whether one or more characteristics of the packet correspond to rules that identify and/or describe malicious packets. In the event that the packet filter determines that the packet is not to be discarded (e.g., that the packet is not malicious), method 600 may proceed to step 630(a). At step 630(a), the packet filter may pass the packet to a processing unit of the network device such that the packet may be forwarded or otherwise appropriately handled. Method 600 may then terminate. However, in the event that the packet filter determines that the packet is to be discarded (e.g., due to the packet containing one or more malicious characteristics), method 600 may proceed to step 630(b). At step 630(b), the packet filter may flag the packet to be discarded.

After completing step 630(b), method 600 may proceed to step 640. At step 640, the packet filter may determine whether the packet is part of a set of related packets. For example, the packet filter may determine whether the packet is a portion of a larger packet that was fragmented by an upstream network device. In the event that the packet filter determines that the packet is not part of a set of related packets, method 600 may terminate. However, in the event that the packet filter determines that the packet is part of a set of related packets, method 600 may proceed to step 650. At step 650, the packet filter may dynamically activate a rule to detect the related packets. For example, the packet filter may create and then implement a rule that contains criteria used to identify packet fragments related to the packet fragment received at step 610.

Next, at step 660, the packet filter may detect the related packets based on the activated rule. For example, the packet filter may compare incoming packets received at the packet filter with criteria contained in the rule created at step 650. At step 670(a), the packet filter may determine that each related packet has been received. Additionally or alternatively, at step 670(b), the packet filter may determine that a certain period of time has lapsed since the initial packet was received at step 610. In response to fulfilling the conditions of either or both step 670(a) and step 670(b), method 600 may proceed to step 680. At step 680, the packet filter may deactivate the rule that was activated at step 650. Method 600 may then terminate.

Figure 7:
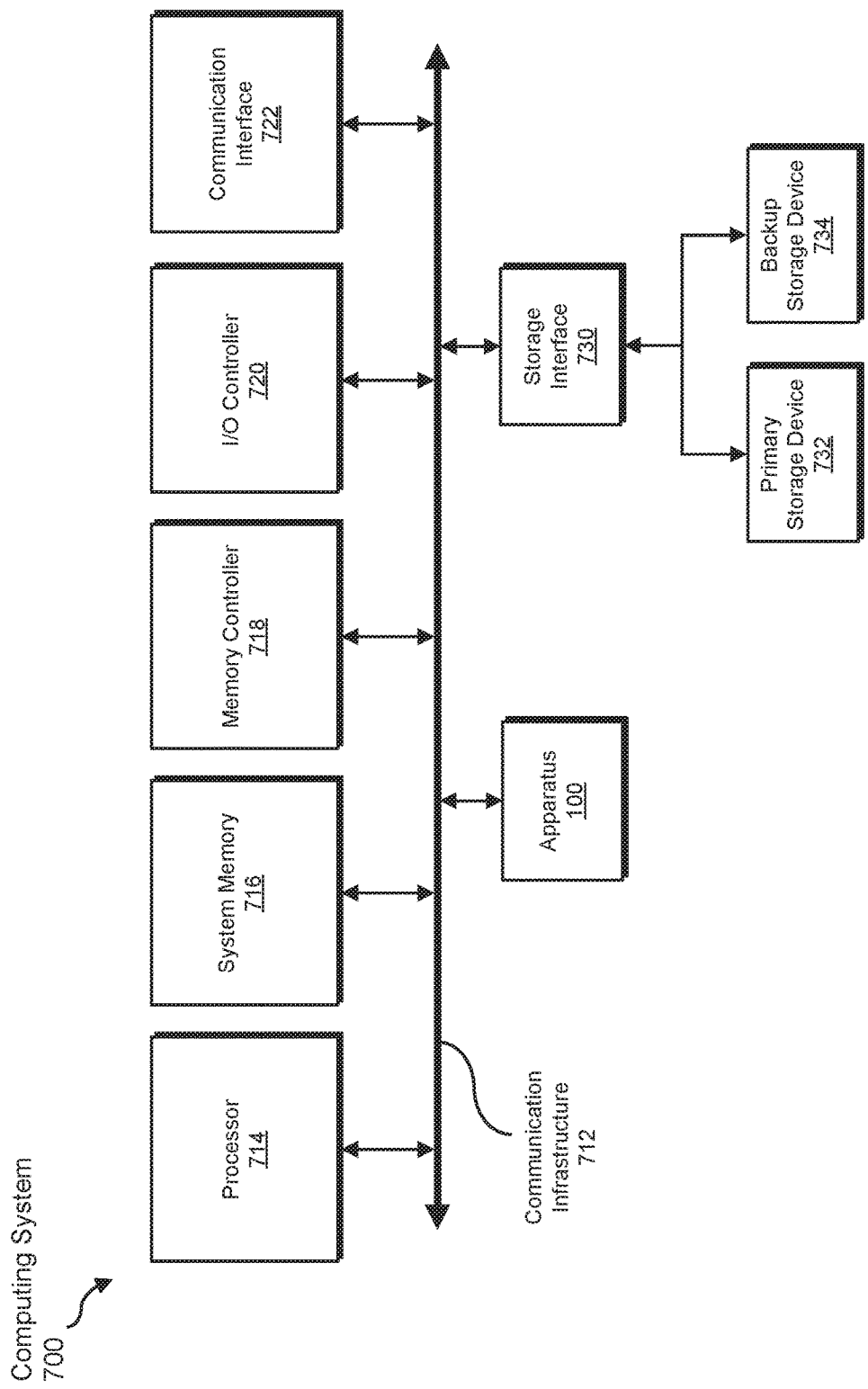
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and 1/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying, at a packet filter within a network device, a source port of a packet within a header of the packet;
   discarding the packet based at least in part on the source port of the packet identified within the header of the packet;
   determining that the packet is a first fragment included in a set of related fragments destined at least intermediately for the network device based at least in part on:
   one or more fragmentation flags within an additional header of the packet; and
   a fragmentation offset within the additional header of the packet;
   generating, in response to determining that the packet is the first fragment included in the set of related fragments, a packet filter rule that contains criteria used to determine whether any additional packets are included in the set of related fragments;
   activating the packet filter rule within the packet filter;
   monitoring the packet filter for at least one additional packet destined at least intermediately for the network device based at least in part on the packet filter rule;
   while monitoring the packet filter, determining that the additional packet is a final fragment included in the set of related fragments based at least in part on:
   a destination address of the additional packet matching a destination address of the packet;
   one or more fragmentation flags within a header of the additional packet;
   a fragmentation offset within the header of the additional packet;
   an Internet protocol identification number of the additional packet matching an Internet protocol identification number of the packet; and
   a source Internet protocol address of the additional packet matching a source Internet protocol address of the packet;
   discarding the additional packet instead of passing the additional packet to a processing unit within the network device due to the additional packet being included in the set of related fragments; and
   in response to determining that each fragment included in the set of related fragments has been received at the packet filter, deactivating the packet filter rule within the packet filter by removing the packet filter rule from a list of currently-active rules to avoid wasting computing resources necessary to continue monitoring the packet filter for any further fragments in connection with the set of related fragments.

2. The method of claim 1, further comprising flagging the packet to be discarded instead of passed to the processing unit within the network device comprises:
   detecting at least one malicious characteristic of the packet; and
   flagging the packet based on the malicious characteristic of the packet.

3. The method of claim 1, wherein determining that the packet is the first fragment included in the set of related fragments comprises determining that the set of related fragments collectively represent an original packet that was divided into multiple fragments by an upstream network device.

4. The method of claim 3, further comprising identifying each remaining fragment of the original packet as each remaining fragment is received by the packet filter.

5. The method of claim 3, further comprising:
   extracting, from within the first fragment included in the set of related fragments, information that identifies the original packet; and
   determining that the additional packet contains both:
   the information that identifies the original packet; and
   an indication that the additional packet is a packet fragment.

6. The method of claim 5, wherein the information that identifies the original packet comprises at least one of:
an Internet protocol identification number of the original packet; and
a source internet protocol address of the original packet.

7. The method of claim 1, further comprising deactivating an additional packet filter rule within the packet filter after a certain amount of time following activation of the additional packet filter rule.

8. A system comprising:
a memory;
an identification module, stored in the memory, that identify, at a packet filter within a network device, a source port of a packet within a header of the packet;
a discard module, stored in the memory, that discards the packet based at least in part on the source port of the packet identified within the header of the packet; and
a determination module, stored in the memory, that determines that the packet is a first fragment in a set of related fragments destined at least intermediately for the network device based at least in part on:
one or more fragmentation flags within an additional header of the packet; and
a fragmentation offset within the additional header of the packet;
wherein the identification module further:
generates, in response to determining that the packet is the first fragment included in the set of related fragments, a packet filter rule that contains criteria used to determine whether any additional packets are included in the set of related fragments;
activates the packet filter rule within the packet filter; and
monitors the packet filter for at least one additional packet destined at least intermediately for the network device based at least in part on the packet filter rule;
wherein the determination module further determines that the additional packet is a final fragment included in the set of related fragments based at least in part on:
a destination address of the additional packet matching a destination address of the packet; one or more fragmentation flags within a header of the additional packet;
a fragmentation offset within the header of the additional packet;
an Internet protocol identification number of the additional packet matching an Internet protocol identification number of the packet; and
a source Internet protocol address of the additional packet matching a source Internet protocol address of the packet;
wherein the discard module further discards the additional packet instead of passing the additional packet to a processing unit within the network device due to the additional packet being included in the set of related fragments;
wherein the identification module further deactivates, in response to determining that each fragment included in the set of related fragments has been received at the packet filter, the packet filter rule within the packet filter by removing the packet filter rule from a list of currently-active rules to avoid wasting computing resources necessary to continue monitoring the packet filter for any further fragments in connection with the set of related fragments; and
at least one hardware processor configured to execute the determination module, the identification module, and the discard module.

9. The system of claim 8, further comprising a flagging module, stored in memory, that flags the packet to be discarded instead of passed to the processing unit within the network device by:
detecting at least one malicious characteristic of the packet; and
flagging the packet based on the malicious characteristic of the packet.

10. The system of claim 8, wherein the determination module determines that the packet is the first fragment included in the set of related fragments by determining that the set of related fragments collectively represent an original packet that was divided into multiple fragments by an upstream network device.

11. The system of claim 10, wherein the identification module identifies each remaining fragment of the original packet as each remaining fragment is received by the packet filter.

12. The system of claim 10, wherein the identification module:
extracts, from within the first fragment included in the set of related fragments, information that identifies the original packet; and
determines that the additional packet contains both:
the information that identifies the original packet; and
an indication that the additional packet is a packet fragment.

13. The system of claim 12, wherein the information that identifies the original packet comprises at least one of:
an Internet protocol identification number of the original packet; and
a source internet protocol address of the original packet.

14. The system of claim 8, wherein the identification module further deactivates the packet filter rule within the packet filter after a certain amount of time following activation of the packet filter rule.

15. An apparatus comprising:
at least one storage device that stores rules used by a packet filter within a network device to discard certain packets received at the network device; and
at least one physical processing device communicatively coupled to the storage device, wherein the physical processing device:
identifies, at the packet filter, a source port of a packet within a header of the packet;
discards the packet based at least in part on the source port of the packet identified within the header of the packet and at least one rule stored within the storage device;
determines that the packet is a first fragment included in a set of related fragments destined at least intermediately for the network device based at least in part on:
one or more fragmentation flags within an additional header of the packet; and
a fragmentation offset within the additional header of the packet;
generates, in response to determining that the packet is the first fragment included in the set of related fragments, a packet filter rule that contains criteria used to determine whether any additional packets are included in the set of related fragments;
activates the packet filter rule within the packet filter;
monitors the packet filter for at least one additional packet destined at least intermediately for the network device based at least in part on the packet filter rule;
while monitoring the packet filter, determines that the additional packet is a final fragment included in the set of related fragments based at least in part on:

a destination address of the additional packet matching a destination address of the packet;
one or more fragmentation flags within a header of the additional packet;
a fragmentation offset within the header of the additional packet;
an Internet protocol identification number of the additional packet matching an Internet protocol identification number of the packet; and
a source Internet protocol address of the additional packet matching a source Internet protocol address of the packet;
discards the additional packet instead of passing the additional packet to a processing unit within the network device due to the additional packet being included in the set of related fragments; and
in response to determining that each fragment included in the set of related fragments has been received at the packet filter, deactivates the packet filter rule within the packet filter by removing the packet filter rule from a list of currently-active rules to avoid wasting computing resources necessary to continue monitoring the packet filter for any further fragments in connection with the set of related fragments.

\* \* \* \* \*